ns of controlling a plurality of loads in accordance with time signals.

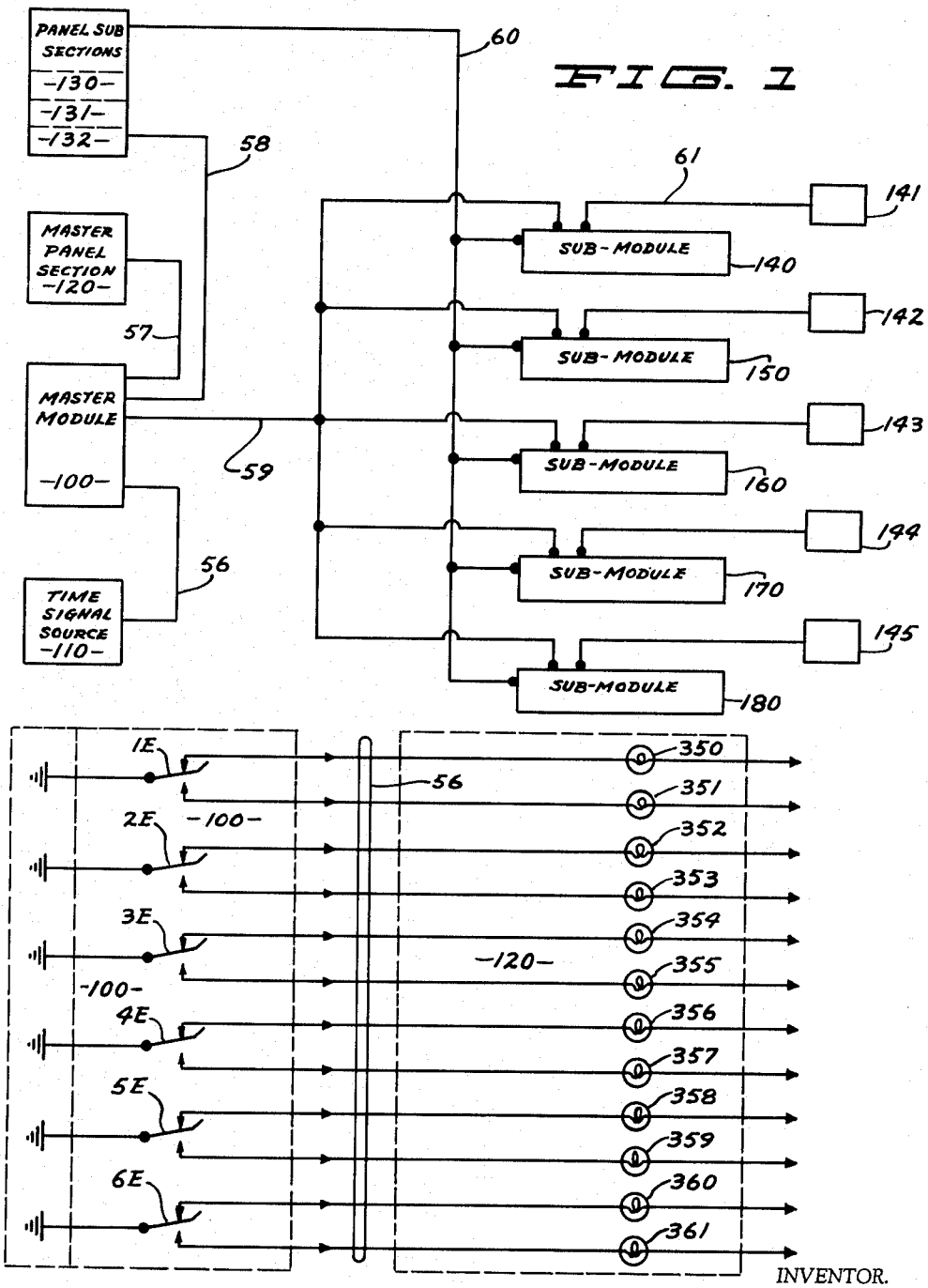

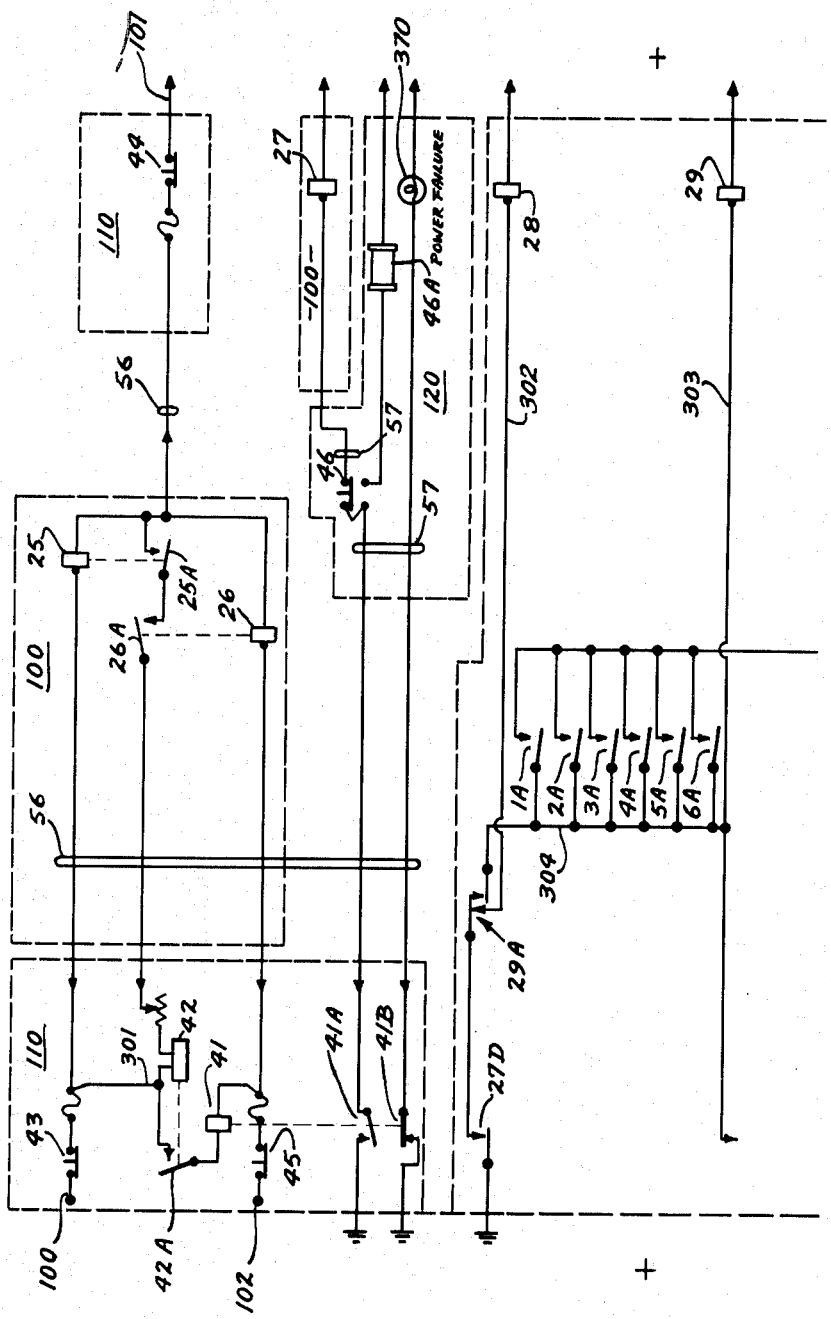

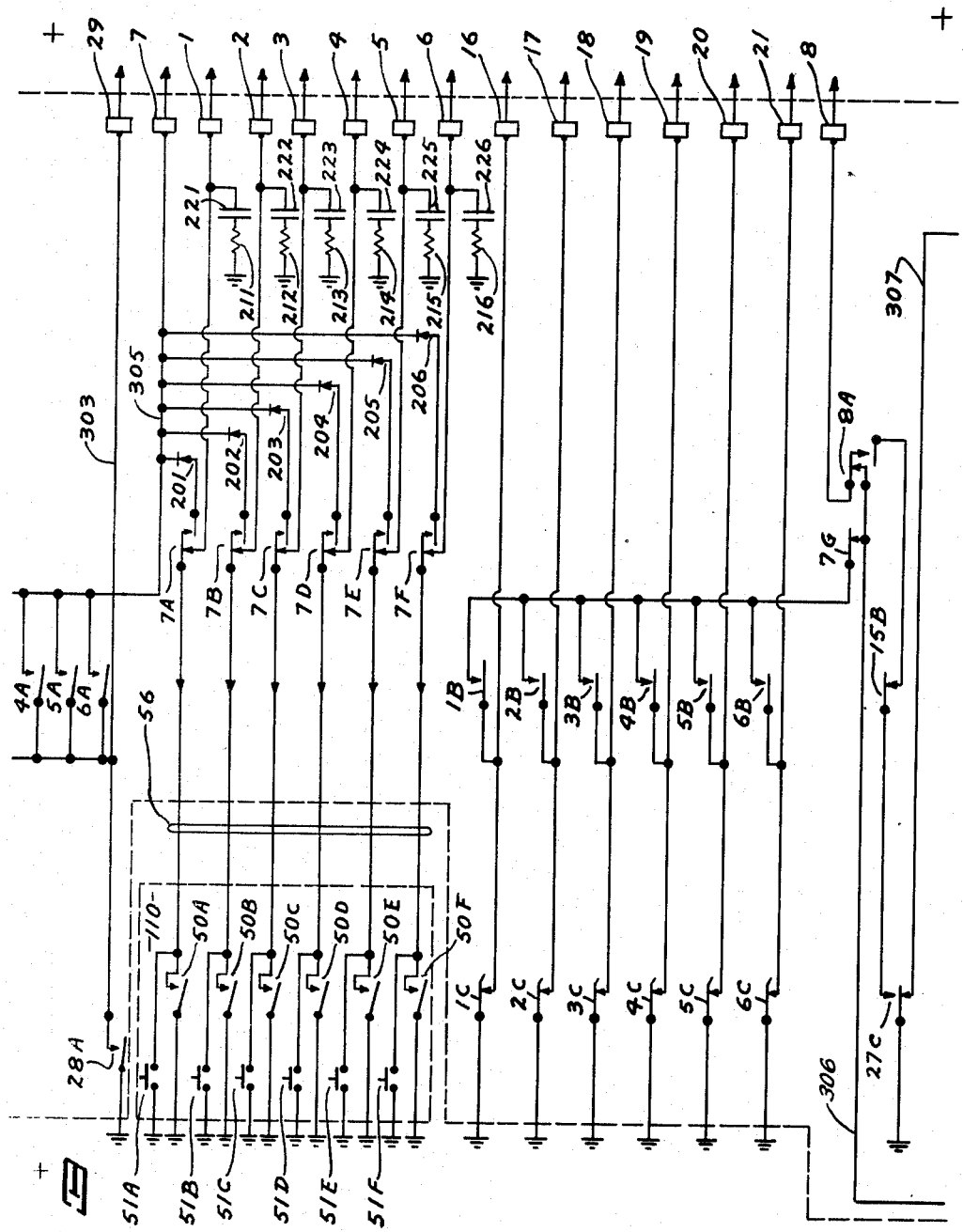

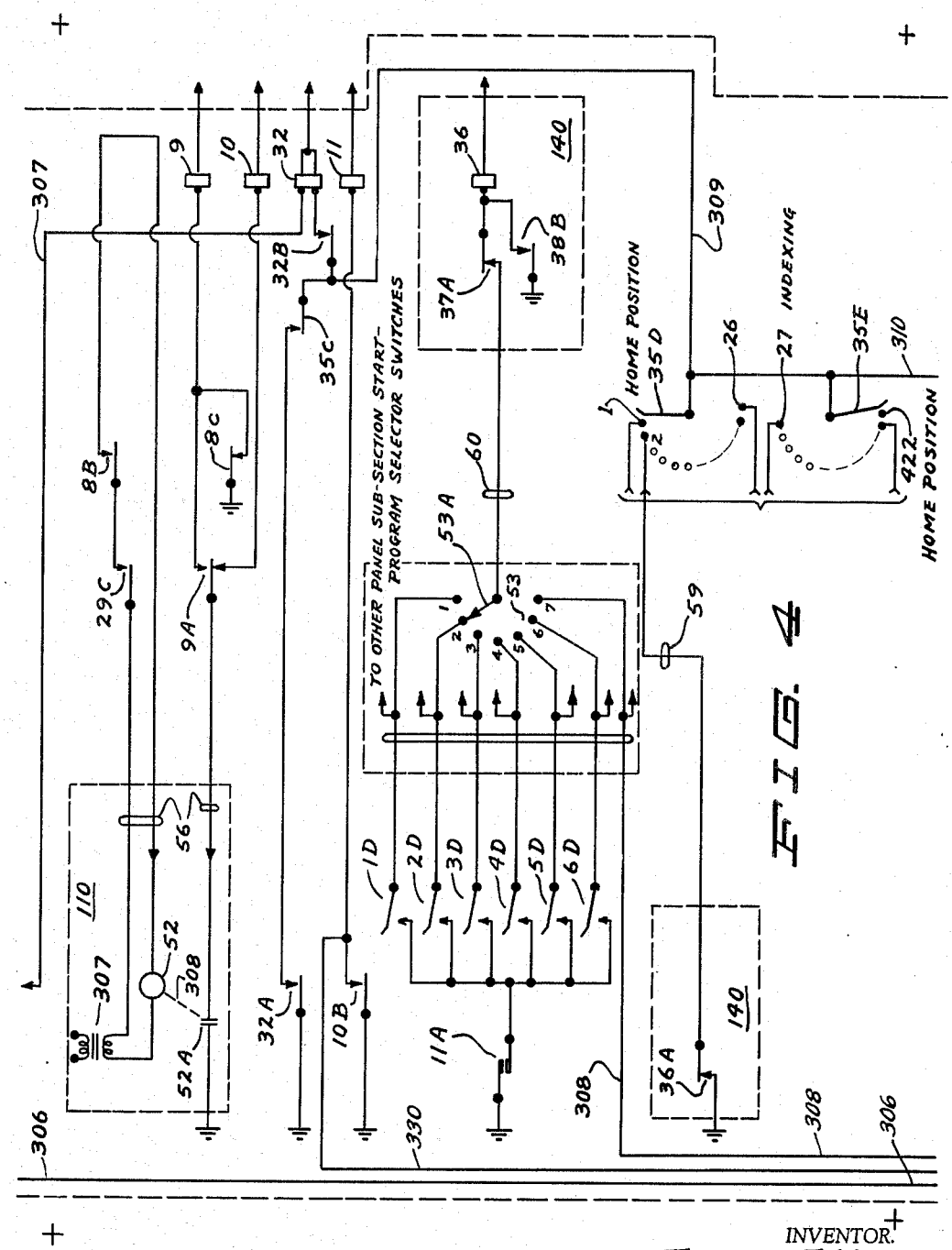

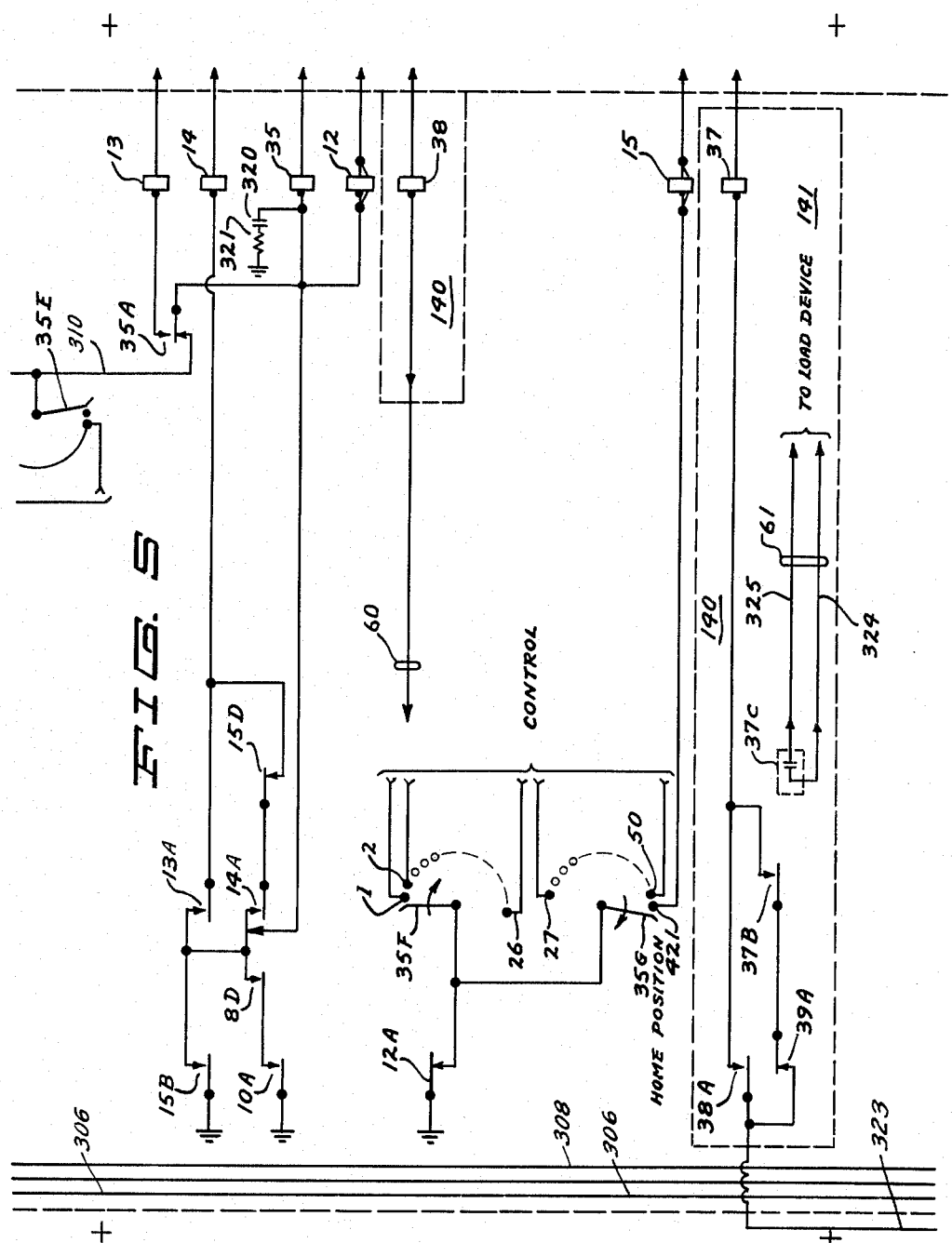

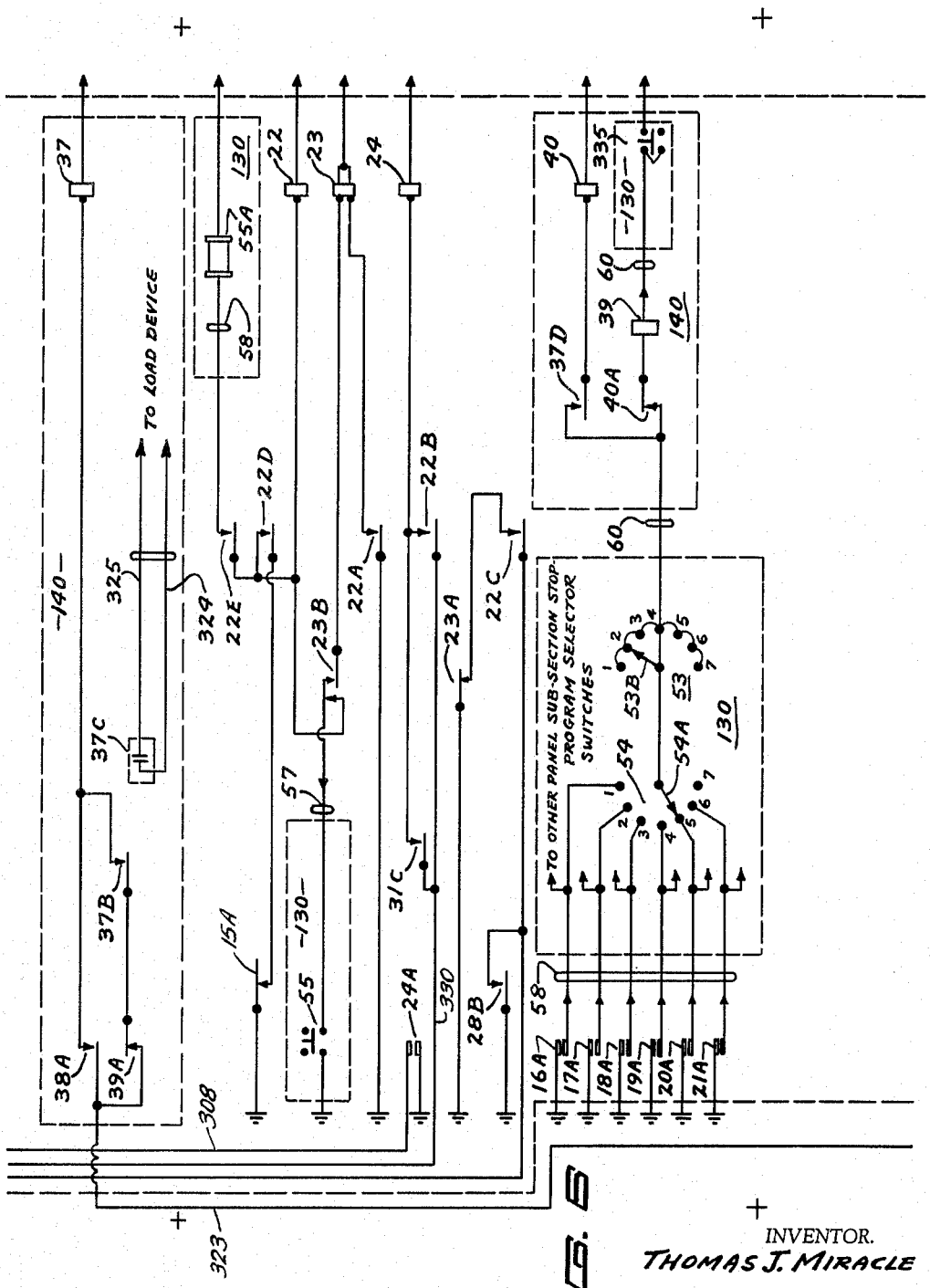

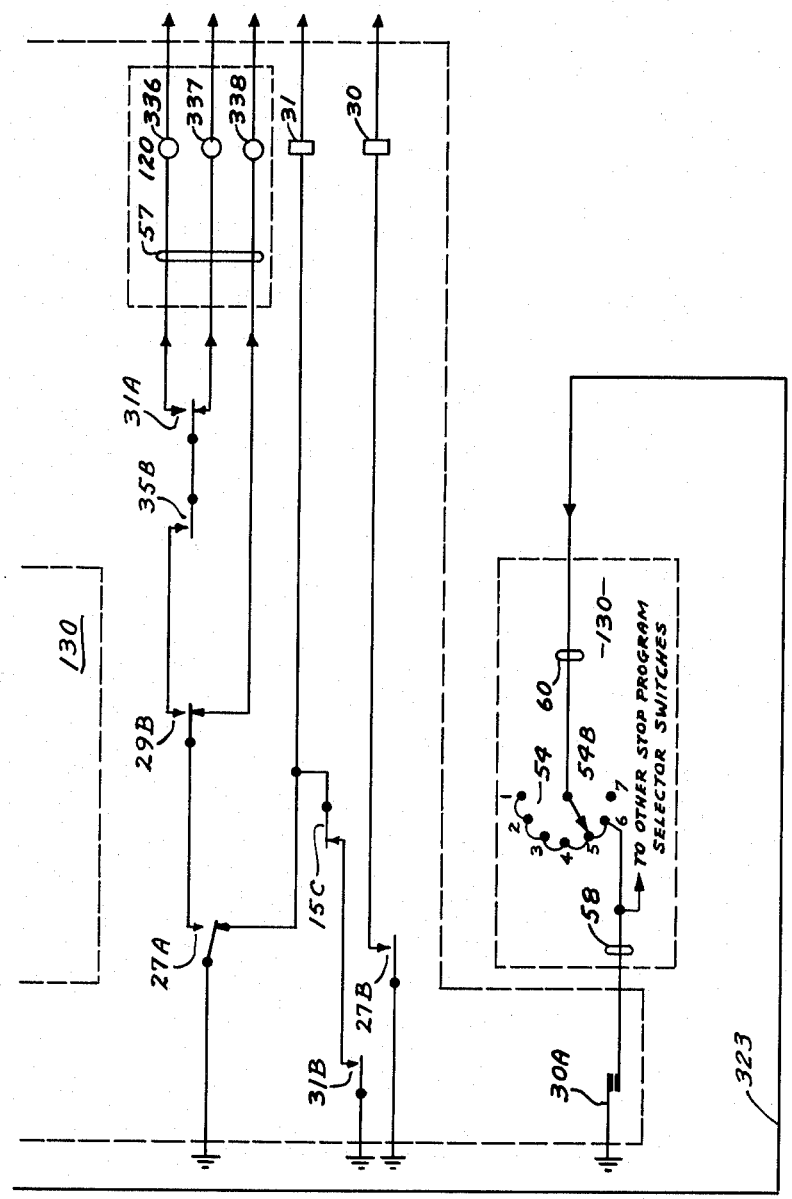

United States Patent Office 3,205,368
Patented Sept. 7, 1965

3,205,368
CONTROL APPARATUS FOR CONTROLLING A PLURALITY OF LOADS
Thomas J. Miracle, Honolulu, Hawaii, assignor to Honeywell Inc., a corporation of Delaware
Filed Jan. 17, 1961, Ser. No. 83,231
10 Claims. (Cl. 307—38)

This invention relates to apparatus for controlling a plurality of loads and more particularly relates to apparatus for controlling the energization and de-energization of a plurality of loads in accordance with time signals in which the energization and de-energization of each of a plurality of loads may be provided in a random manner and in which the energization of each of said loads is provided in a sequential manner so that simultaneous energization of loads is prevented.

It is contemplated that the present invention will, for example, provide control apparatus for controlling a plurality of loads, such as the loads normally found in a large office building, from a central location such that the operation of the loads may be controlled by automatic time signal equipment for energization and de-energization thereof. It is recognized, there have been many attempts to provide operation of this general character in controlling a plurality of loads, however, the relative complexity and lack of versatility have precluded wide spread use due to the relatively high economic cost of installation and operation. The present invention provides, for instance, control apparatus that may utilize standard time signals obtained from conventional clock systems, normally found in public buildings, and control a plurality of loads in accordance with the square of the number of time signal channels available. For instance, the described embodiment provides 36 combinations of energization and de-energization times from a total of 6 time channel signal sources. The number of loads which may be controlled in this manner is dependent only upon the proper choice of suitable components for use in the system.

It may further be noted that the secondary economic factor of reducing the electrical service required for a building to minimum running load requirements consistent with good design practice, becomes quite large when a consideration is given to the multiplying factor applied to service requirements for heavy starting current loads. It is believed customary to apply a multiplying factor of 4 to allow for starting current requirements. By eliminating this factor, a considerable saving may be effected in the initial installation size of a power distribution service connection. Furthermore, a relatively constant high power factor from the total load may be achieved since the starting of one of a plurality of loads will have no substantial effect on the overall system.

It is therefore an object of this invention to provide new and novel control apparatus for controlling the energization and de-energization of a plurality of electrical loads.

It is a further object of this invention to provide control apparatus in which the number of sources of timed signals for operation of inter-connected electrical loads is reduced to a minimum value.

It is a further object of the present invention to provide control apparatus which may be operated by a minimum number of supervisory personnel.

It is a further object of this invention to provide control apparatus which is highly versatile in the controlling of the energization and de-energization of each of a plurality of load devices.

It is a still further object of this invention to provide new and novel control apparatus for performing the functions of controlling a plurality of loads in accordance with time signals.

It is another object of this invention to provide control apparatus which is responsive to undesirable conditions to automatically de-energize and re-energize a plurality of electrical loads.

It is a still further object of this invention to provide control apparatus which controls the energization and de-energization of load devices from a central location.

These and other more detailed and specific objects will be disclosed in the course of the following specification, reference being had to the accompanying drawings, in which—

FIG. 1 is a block diagram of one embodiment of my invention.

FIGS. 2 through 8 constitute a functional schematic diagram illustrative of the principles and operation of my invention.

Referring now to FIG. 1 there is shown a plurality of load devices 141 to 145 for energization and de-energization in accordance with time signals supplied from a source of time signals 110. The load devices are connected to sub-modules 140 to 180 respectively which, in turn, are connected to a panel sub section through a common cable 60 and are also connected in parallel to a master module 100 through cable 59. A master panel section 120 is connected to master module 100 which is also connected to panel sub section 130 through a cable 58 and a time signal source 110 through cable 56. It is understood that the cables referred to contain a number of individual conductors which will be referred to in connection with FIGS. 2 through 8.

Briefly, there is a sub-module provided for each load device to be energized and de-energized, a panel sub section corresponding to each of the sub modules, one master module, one master panel section and one time signal source. It is contemplated that the panel sections 130 and master panel section 120 and master module 100 and time signal source 110 will be located at a central location for use by supervisory personnel. The sub module associated with a particular load device may be located in proximity thereto or also at the central location dependent upon the circumstances involved in particular installations.

Referring to FIGS. 2 through 8, a functional schematic diagram of my control apparatus is shown in which dotted lines are utilized to enclose portions of the schematic which are physically located in corresponding portions of the block diagram of FIG. 1. Appropriate corresponding cable connections are indicated to enable a suitable understanding of the physical locations. Further, the diagram is provided with all of the relay windings connected across a source of direct current (not shown) which is contemplated to be of the type utilized in telephone and fire alarm systems that are not dependent upon commercial sources for continuous supply.

Reading the schematic from FIG. 2 and proceeding through FIGS. 3, 4, 5, 6, 7 and 8:

A plurality of power input terminals 100, 101 and 102 are provided for connection to a suitable three wire source of alternating current (not shown). Terminal 101 is connected to terminal 100 through a push button switch 44, cable 56, alternating current relay 25, cable 56 and push button switch 43. Terminal 101 is also connected to terminal 102 through push button switch 44, cable 56, alternating current relay 26, cable 56 and push button swich 45. Appropriate fuse members are also included in the circuitry. Terminal 101 is also connected to terminal 100 through a circuit including push button switch 44, cable 56, relay contact 25A, relay contact 26A, cable 56, time delay relay 42 and to terminal 100 through conductor 301 and switch 43 and also to terminal 102 through relay contact 42A, relay winding 41 and switch 45.

A relay winding 27 is connected between the positive terminal of the source of direct current (as indicated by the triangular symbol) and ground through cable 57, push button switch 46, cable 57, cable 56, and relay contacts 41A. A pilot light indicator 46A is also connected between the positive terminal and ground through push button switch 46, cable 57, cable 56 and relay contact 41A. A further pilot light is connected between a positive terminal and ground through cable 57, cable 56 and relay contact 41B. Time delay relay winding 28 (having approximately a one minute delay) is connected between a positive terminal and ground through conductor 302, connected to a stationary contact on relay contact assembly 29A, and through relay contacts 27D. Referring to FIGURE 3, a further relay winding 29 is connected between a positive terminal and ground through conductor 303 and relay contacts 28A. The stationary contact in relay contact assembly 28A is connected to a movable contact in relay contact 29A through a conductor 304 which is also connected in parallel with movable contacts on contact assemblies 1A through 6A. Relay winding 7 is connected between a positive terminal and the stationary contacts on relay contact assembly 1A through 6A through a conductor 305 and is also connected to the movable contacts on relay assemblies 7B, 7C, 7D, 7E and 7F through asymmetrical current devices 201, 202, 203, 204, 205 and 206 respectively. Relay winding 1 is connected between a positive terminal and ground through relay contact assembly 7A, cable 56 and time signal source contact 50A having push button switch means 51A connected in parallel therewith. A capacitor 221 and resistor 211 are also connected in series between ground and the relay winding 1. Relay windings 2 through 6 are correspondingly connected to ground through relay contact assemblies 7B, 7C, 7D, 7E and 7F, and time signal source contacts 50B, 50C, 50D, 50E, 50F respectively. Each of the relay windings, 2 through 6, is provided with corresponding capacitors 222, 223, 224, 225 and 226 and resistors 212, 213, 214, 215 and 216 respectively.

Relay winding 16 is connected to ground through relay contact assembly 1C. In like manner relay windings 17 through 21 are connected to ground through relay contact assemblies 2C through 6C respectively. Each of the stationary contacts on relay contact assemblies 1C through 6C is connected to a movable contact on relay contact assemblies 1B through 6B respectively. The stationary contacts on relay contact assemblies 1B through 6B are connected in parallel and in turn connected to the movable contacts on relay assembly 7G.

Relay 8 is connected between a positive terminal and ground through a first path including the movable contacts for relay contact assembly 8A, relay contact assembly 15B and an open circuit portion relay contact assembly 27C. A second path paralleling the last named path may be traced through the left hand stationary contact on contact assembly 8A, the stationary contact on contact assembly 7G, conductor 306 and relay contact assembly 28B connected to ground as shown in FIGURE 6 having a series connection of relay contact assembly 22C and relay contact assembly 23A in parallel therewith. Again, referring to FIG. 4, relay winding 32 is connected between a positive terminal and ground through conductor 307 and the lower stationary contact or closed circuit portion on relay contact assembly 27C. A further connection between relay 32 and ground is provided through relay contact 32B, stepping switch contact 35C and relay contact 32A. A transformer means 304 having primary terminals adapted for connection with a suitable source of alternating current (not shown) has a secondary winding which may be connected to a timing motor 52 through a circuit including relay contact assembly 29C, relay contact assembly 8B and cable 56.

Relay 9 is connected between a positive terminal and ground through relay contact assembly 8C and through a normally open switch of relay contact assembly 9A, cable 56, and timing motor switch 52A driven by the timing motor through driving means 308. Relay 10 is connected between a positive terminal and ground through a normally closed switch of relay contact assembly 9A, cable 56 and timing motor contacts 52A. Relay 11 is connected to ground through relay contact 10B.

A starting program selector switch 53 includes a wiper 53A adapted for coaction for corresponding terminals indicated by numerals 1 through 7. Wiper 53A is connected to relay winding 36 through cable 60 and relay contact assembly 37A. A further relay contact assembly 38B is connected between a movable portion of contact assembly 37A and ground. Each of the stationary contacts 1 through 6 on switch 53 is connected to corresponding relay contact assemblies 1D through 6D through cable 58. The stationary contacts on relay contact assemblies 1D through 6D are connected in parallel and to ground through relay contacts 11A. Stationary contact 7 on switch 53 is further connected to ground through conductor 308 and relay contact 24A.

Stepping switch indexing assembly wipers 35D and 35E are connected to the movable contact on relay contact 32B through conductor 309 and to the lower stationary contact on stepping switch contacts 35A through conductor 310. Wipers 35D and 35E are adapted to coact with a plurality of stationary contacts suitably positioned. Each of the stationary contacts may be connected to ground through appropriate circuitry. So as not to unduly complicate the present schematic, stationary contact 2 which coacts with wiper 35D is shown connected through cable 59 and relay contacts 36A. Relay winding 14 is connected from a positive terminal to ground through relay contact assemblies 13A and 15B. The movable contact on contact assembly 13A is connected to the stationary contact on contact assembly 15D. The stationary contact on relay contact 13A is connected to the stationary contact on relay contact assembly 8D. Relay 13 is connected to the positive supply and to ground through an upper normally open contact of relay assembly 35A. A movable member of relay assembly 35A is connected through relay 12 to the positive source.

Stepping switch relay winding 35 is connected between a positive terminal and ground through relay contact assembly 14A, relay contact assembly 8D and relay contact assembly 10A. A capacitor 320 and resistor 321 are connected between ground and stepping switch relay winding 35. Stepping switch relay 35 is also connected to the movable contact on its contact assembly 35A. Also connected between a positive terminal and the movable contact on contact assembly 35 is a further relay 12.

The stepping switch control contact assembly includes wipers 35F and 35G both of which are connected to ground through relay contact assembly 12A. A plurality of contacts adapted for coaction with wipers 35F and 35G are provided for connection, one for each individual sub-module through cable 60. In the present embodiment, stationary contact 2 is connected to relay winding 38 through cable 60. It will be noted that while the present embodiment is designed to accommodate 50 load devices, 52 stationary contacts are provided on the stepping switch control assembly. Relay winding 15 is connected between a positive terminal and the stationary contact 51 adapted to coact with wiper 35G which purpose is thereby explained below in conjunction with the explanation of the operation of the system.

Referring to FIGURE 5, relay winding 37 is connected between a positive terminal and ground through relay contact assembly 38A, conductor 323, cable 60 of FIGURE 7 movable contact 54B on switch 54, stationary contact 5 on switch 54, cable 58 and relay contact assembly 30A. Relay contact assembly 38A is connected in FIGURE 5 in parallel with a series connection of relay contact assemblies 37B and 39A. Relay contact assembly 37C is adapted to close a circuit through a pair of conductors 324 and 325 of cable 61 for controlling of a load device.

Relay winding 22 is connected between a positive terminal and ground through relay contact assembly 23B and push button switch 55. A pilot light assembly 55A is connected between a positive terminal and ground through a circuit including relay contact assembly 22E, relay contact assembly 22D and relay contact assembly 15A. The stationary contact on relay contact assembly 22D is also connected to the left hand stationary contact on relay contact assembly 23B. Dual coil relay windings 23 are connected in common to a positive terminal. The upper coil is connected to ground through relay contact assembly 23B, cable 57 and push button switch 55. The lower coil is connected to ground through relay contact assembly 22A. Relay winding 24 is connected between a positive terminal and the stationary contact of relay contact assembly 10B of FIGURE 4 through relay contact assemblies 22B and 31C of FIGURE 6 connected in parallel and conductor 330.

Relay contact assemblies 16A through 21A of FIGURE 6 are connected between ground and stationary contacts 1 to 6 respectively on rotary switch 54 through conductors in cable 58. Movable contact 54A is electrically connected to 53B on rotary switch 53. Stationary contacts 1 to 6 adapted for coaction with movable contact 53A are connected in common and in turn connected through cable 60 to relay winding 39, relay contact assembly 40A and to relay winding 40 through relay contact assembly 37D. Relay winding 40 is connected to a positive terminal. Relay winding 39 is also connected to a positive terminal through cable 60 and push button switch 335.

A plurality of pilot light indicators 336, 337, 338 of FIGURE 7 may be connected from suitable positive terminals to ground through relay contact assemblies 31A, 35B, 29B and 27A. Relay winding 31 may be connected between a positive terminal and ground through relay contact assembly 27A or relay contact assembly 15C and 31B connected in parallel therewith. Relay winding 30 may be connected between positive terminal and ground through relay contact assembly 27B.

The above diagram contains circuitry illustrating an embodiment of my invention for one load only. It will be clear to those skilled in the art that additional sub modules equal in number to the available contacts on the stepping switch indexing assembly and the stepping switch control assembly, and that contacts corresponding numerically on the indexing assembly to the control assembly, will be connected to the same sub module assemblies. Further, the functional schematic drawing shows all of the relay contacts in the de-energized position. The legends and corresponding brackets indicate the function of the circuitry enclosed therein. The numbers applied to the dotted enclosures of the drawing correspond to the numbers applied to the several components of the system illustrated in the block diagram of FIG. 1.

In FIG. 8, a plurality of indicating pilot lamps 358 to 361 are connected to be energized by relay contact assemblies 1E to 6E through cable 56.

OPERATION

It will be initially assumed that all of the time signal source channel switches 50A to 50F are open, that is, there is an open circuit between the relay windings 1 through 6 and ground. It will be further assumed that the sub module 140 is to be energized at the time that time signal source contact 50B associated with relay winding 2 provides a suitable signal by closure thereby.

When alternating current power is initially applied to terminals 100, 101 and 102 of FIGURE 2, alternating current relays 25 and 26 are energized to close their respective contacts 25A and 26B which in turn energize the winding of time delay relay 42. The closure of contacts 42A associated with time delay relay 42 serves to complete a circuit through relay winding 41. The energization of relay winding 41 serves to close relay contacts 41A to complete a circuit to energize relay winding 27 and to open contacts 41B to de-energize power failure indicating pilot light 370. The energization of relay winding 27 closes contact assemblies 27D of FIGURE 2 and 27B of FIGURE 7 to energize relay windings 28 and 30 respectively and also moves the movable contact in relay contact assemblies 27A of FIGURE 7 and 27C of FIGURE 3 from engagement with the lower stationary contact to the upper stationary contact.

The closure of relay contact assembly 27D serves to energize time delay relay 28 which in turn closes its associated contacts 28A of FIGURE 3 and 28B of FIGURE 6. The closure of contact 27B serves to energize relay winding 30 which in turn closes relay contact assembly 30A connected to the stationary contacts 1 to 6 which in turn are connected to wiper 54B of switch 54. The energization of relay winding 29 of FIGURES 2 and 3 due to the closing of relay contact assembly 28A serves to establish a holding circuit for relay winding 29 through relay contacts 29A and to de-energize relay winding 28. Relay 28 is adapted to provide a one minute time delay before closing contact assemblies 28A and 28B. The energization of relay 29 serves to position the movable contact on contact assembly 29B in FIGURE 7 on the upper stationary contact to de-energize time delay pilot light indicator 338. The closing of contact assembly 29C of FIGURE 4 completes part of the circuit energization for the timing motor 52. It may be noted at this point that relay windings 1 through 6 serve to actuate a plurality of sets of contacts, some of which are actuated to close upon energization of the respective relay windings and some of which are actuated by a camming mechanism that serves to close the respective contacts on the first de-energization of the relay winding and which remain closed after de-energization until a subsequent energization and de-energization occurs which serves to open the contacts and leaves them in an open state.

The last named function may be accomplished in a manner known to those skilled in the art and is known as a latching relay. The A and B contacts of relays 1 to 6 are of the former type and the C, D and E contacts of relay 1 to 6 are of the latter type.

It will be recognized that the initial energization provides a time delay to allow for correction, if necessary, occurring in the internal circuitry of the time signal source, for example in a master clock system upon resumption of power after a failure. Further, the energization of relay winding 28 of FIGURE 2 and contact assembly 28B of FIGURE 6 serves to energize relay winding 8 to initiate operation of the apparatus to start all loads which may be programmed for a start at that particular time. Upon completion of a cycle of the apparatus, the relay winding 8 is de-energized and the apparatus is in readiness for reception of time signals to initiate energization or de-energization of pre-determined load devices.

Assuming that a time signal from source 110 is provided by the closure of contacts 50B in FIGURE 3, a circuit is completed to energize relay winding 2 which in turn closes relay contacts 2A to provide an energization circuit for slow acting relay winding 7 and simultaneously closes contact 2B to energize relay winding 8 through relay contact 7G and relay contact 8A. After relay winding 8 is energized, relay 7 operates to open contacts 7B and to de-energize relay 2. Relay contact 2C opens and relay contact 2D closes to de-energize relay winding 17 and to connect relay contacts 11A of FIGURE 4 to stationary contact 2 to which movable contact 53A on switch 53 is connected. Further, on operating relay 7, the movable contact in relay contact assembly 2E (FIG. 8) is positioned against the lower stationary contact to disconnect pilot indicator 352 (which indicates a stop condition for channel 2) and to connect pilot indicator 353 to thereby indicate a start condition for channel 2. The above functions of all of the non-cammed contacts associated with relay 2 occur prior to energization of slow acting relay 7. The camming operations of the cam contacts of relay 2 occur on the de-energization of relay 2 winding. Upon energization of relay 7, all of the "make before break" contacts, 7A through 7F, are actuated to prevent accidental energization of any of the relay windings 1 to 6 and to provide a holding circuit for relay 7 upon the de-energization of relay 2 through operation of relay contact assembly 7B. Relay contact assembly 7G is also opened.

The energization of relay winding 8 in FIGURE 3 serves to actuate relay contact assembly 8A to establish a holding circuit to maintain relay 8 energized through relay contact assembly 15B and relay contact assembly 27C. Relay contact assembly 8B is closed to complete a circuit to energize motor 52.

The closing of relay contact assembly 8D of FIGURE 5 serves to connect relay contact assembly 10A to stepping switch relay winding 35 through relay contact assembly 14R.

Relay contact assembly 8C of FIGURE 4 is opened to de-energize relay winding 9 to connect relay winding 10 through lower stationary contact on relay contact assembly 9A to time contacts 52A operated by motor 52. It will be noted that the contacts 52A may be designed to be adjusted to close once every 20 seconds and to remain closed for one second. The one second energization of relay winding 10 serves to energize relay winding 11 through the closure of relay contacts 10B and further serves to complete a circuit to stepping switch relay winding 35 of FIGURE 5 through the closing of relay contacts 10A, through closed relay contacts 8D and relay contact assembly 14A. The energization of relay winding 11 in FIGURE 4 closes contacts 11A to complete a circuit through closed contact 2D, stationary contact 2 and wiper 53A on switch 53, through cable 60 and contacts 37A to relay winding 36. The energization of relay winding 36 opens contacts 36A to disconnect the ground connection to indexing terminal 2 adapted to coact with wiper 35D on the indexing portion of stepping switch 35.

The energization of stepping switch relay winding 35 serves to provide an extension of its associated stepping mechanism for wipers 35D, 35E, 35F and 35G and also closes contacts 35B of FIGURE 7 and 35C of FIGURE 4. Contacts 35B remain closed as long as the wipers on the stepping switch assembly are not on their "home," or at rest, position. Contact assembly 35B serves to complete a circuit through relay contact assembly 27A and 29B and relay contact assembly 31A to pilot lights 336 and 337. Relay contact assembly 35C allows completion of a homing circuit for the stepping switch assembly upon power failure and will be described below.

It may be noted that energization of relay winding 35 also energizes relay winding 12 of FIGURE 5 to open contact assembly 12A connected to stepping switch wipers 35F and 35G in the control portion of the stepping assembly to prevent inadvertent and undesired energization of the sub modules connected with the individual contacts in the control portion of the stepping switch assembly. Upon energization of stepping switch relay winding 35, the movable contact in relay contact assembly 35A is positioned against the upper stationary contact to energize relay winding 13. The energization of relay winding 13 serves to close relay contact assembly 13A which serves to complete an energization circuit for relay winding 14 through relay contact assembly 10A and relay contact assembly 8D. The energization of relay winding 14 serves to provide a holding circuit therefor through actuation of relay contact assembly 14A which completes a circuit to ground through the movable contact and the right hand stationary contact thereof and simultaneously serves to disconnect the left hand stationary contact from ground to open the energization circuit for relay winding 35. The de-energization of relay winding 35, after a time delay determined by the operating times of 13R, 14R and 35R and the release time of 35R, allows the stepping mechanism to advance the wipers 35D, 35E, 35F and 35G to the next successive contact, in this case 1. Also, the movable contact on contact assemblies 35A engages the lower stationary contact which provides a connection to ground through conductor 211, wiper 35D, terminal 1 and cable 59 connected to a contact assembly corresponding to contact assembly 36A in another sub module assembly (not shown).

Should the sub module assembly be indexed to start upon energization of channel 2, its relay contact assembly corresponding to contacts 36A would be in an open position. For the purpose of illustration, it will be assumed that this corresponding contact assembly is in a closed position which, of course, serves to complete an energization circuit for relay winding assembly 35 and relay winding 12 connected in parallel therewith.

The alternating energization, de-energization and re-energization of relay winding 35 serves to sequentially step the wipers from contact to contact until engagement with a contact that is not grounded is obtained.

In the present example, terminal 2 on the indexing portion of the stepping switch assembly will be engaged by wiper 35D. When wiper 35D engages terminal 2, relay winding 35 will not be re-energized and the stepping switch assembly will stop at this point. This, of course, indexes wiper 35F on the control portion of the stepping switch assembly at corresponding terminal 2. Since relay winding 12 of FIGURE 5 connected in parallel with relay winding 35 is also de-energized, relay contact assembly 12A is closed and a circuit is completed to relay winding 38 in the sub module through cable 60, terminal 2 on the control portion of the stepping switch assembly, and wiper 35F. The energization of relay winding 38 serves to close relay contact assembly 38A to complete an energization circuit for relay winding 37 through relay contact assembly 39, cable 58, wiper 54B on switch 54, and cable 60.

The energization of relay winding 38 also serves to maintain relay winding 36 of FIGURE 4 through relay contact assembly 38B. The energization of relay winding 37 opens relay contact assembly 37A, closes relay contact assembly 37B to provide a holding circuit for relay winding 37 through relay contact assembly 39A and conductor 323. Further, contact assembly 37C is closed to energize a load device through conductors 324 and 325 and cable 61. Contact 37D of FIGURE 6 is closed to allow energization of relay winding 40 upon the closing of the stopping relay contacts 20A, to which it is connected through cable 60, wiper 53B on switch 53, wiper 54A on switch 54, stationary contact 5 on switch 54, and cable 58. Since the above described sequence is for starting, the stopping relay 20 will be de-energized and the relay contact assembly 20A is open to prevent energization of relay winding 40. Relay 38 remains energized for the remainder of the predetermined period (here 20 seconds) that motor contact assembly 52A, remains open. The time interval, of course, is consistent with the load requirements for increased starting current and, as noted above, a period of 20 seconds is believed reasonable for a normal load.

Upon the re-closing of contact assembly 52A of FIGURE 4, relay winding 10 is again re-energized to initiate operation of the stepping switch assembly (35 of FIGURE 5) in the manner noted above and the wipers on the stepping switch assembly will continue to move until a further sub module terminal, that has been prepared for starting on channel 2, is engaged. It will be noted that the total time for the stepping switch assembly to complete one cycle without stopping must be less than the total time that contacts 52A are closed. This, of course, is dependent upon the characteristics of the particular component selected, however, in one embodiment of my invention, a stepping switch assembly providing a complete cycle in approximately five one-sevenths of a second was observed to provide satisfactory operation where contact assembly 52A was closed for one second.

Immediately preceding the end of one cycle operation of the stepping switch assembly of FIGURE 4, a homing contact 422 is engaged by stepping switch wiper 35E and a further homing contact 421 of FIGURE 5 is engaged by wiper 35G. The engagement of terminal 422 by wiper 35E serves to maintain relay winding 35 in a de-energized position. Of course, relay winding 12 is also de-energized and its associated contact assembly remains closed. The engagement of terminal 421 (by wiper 35G) serves to complete a circuit to ground for the energization of relay winding 15 through contact assembly 12A. The energization of relay winding 15 serves to actuate relay contact assembly 15B to open the holding circuit to relay winding 8. Relay contact assembly 15D is opened to open the holding circuit of relay winding 14. The de-energization of relay winding 14 serves to energize relay winding 35 through relay contact assembly 14A and relay contact assembly 15E. The energization of relay winding 35 serves to energize the stepping mechanism to move wipers to their home positions. Simultaneously, stepping switch contact assemblies 35B and 35C are opened. There will, therefore, be seen that the energization of a given start channel provides automatic sequential energization of any load connected for energization on that start channel through its appropriate sub-module and sub-section to the master module.

The general operation of my invention includes the use of a start pulse, as described above, and the use of a stop pulse to automatically stop previously started loads. The start and stop pulses are supplied from the time signal source which has a plurality of normally opened contacts 50A to 50F which may be closed for a predetermined time interval at predeterminable times during a 24 hour period in systems where standard, commercially available, clock program controllers are utilized. It will be reasonably clear to one skilled in the art that suitable programmers utilizing various other timing periods or means may be utilized.

By suitably positioning wiper 53A of switch 53, anyone of 6 programmed channels may be selected for starting of any or all of the loads connected to the respective sub-modules. In like manner, by suitably positioning wipers 54A and 53B of switches 54 and 53, any one or all of the loads connected to the respective sub-modules may be connected to any one of 6 programmed stop channels. In the embodiment shown, it will be assumed that a programmed de-energization of load 141 connected to sub-module 140 will occur upon generation of a stop signal in channel 5 of the time signal source which will be manifested by the closing of contacts 50E.

Relay 20 is the stopping or de-energization relay for controlling the sub-modules and loads connected to channel 5 by their respective switches on the panel sub sections. Assuming channel 5 has previously received a start pulse and energized all of the loads connected to start of the time of the start pulse on channel 5, the de-energization of sub-module 140 and load 141, previously started in accordance with a start pulse on channel 2 in response to the closing of switch 50B, is as follows: The stop pulse in channel 5 is applied to relay winding 5 to energize its associated contact assemblies so as to close contact assembly 5A and 5B which provides energization of relay winding 7 to in turn actuate relay contact assemblies 7A to 7F and relay contact assembly 7G. The actuation of relay contact assembly 7A to 7F serves to prevent activation of the remainder of the relay windings associated with each of the time channels and to prevent energization of relay winding 8 so as to maintain the stepping switch assemblies inoperative since its operation is not desired when de-energizing loads. The closing of relay contact assembly 5B while relay winding 5 is energized does not provide energization of relay winding 8 through relay contact assembly 7G and 8R since contact assembly 5C is in an open condition during the intervals between the reception of a prior start pulse and a later stop pulse from its respective time channel. The operation of relay 5 is such that energization of the winding thereof actuates contact assemblies 5A and 5B before actuation of the remainder of the contacts 5C, 5D, and 5E which occurs upon de-energization of the winding 5 when relay 7R energizes. The actuation of contact assembly 5C from an open condition to a closed condition serves to energize relay winding 20 to close the associated contacts 20A of FIGURE 6. The actuation of relay contact assembly 5D from a closed to an open position serves to remove the indexing connection from the index portion of the stepping switch assembly and the movement of the stationary contact on contact assembly 5E from the lower stationary contact to the upper contact serves to de-energize the start condition indicating pilot lamp and to energize the stop position indicator lamp connected to the upper stationary contact.

Energization of relay windings 39 and 40 is thus provided through relay contact assembly 20A, terminal 5 and wiper 54A on switch 54, wiper 53B on switch 53, cable 60 and contacts 40A and 37D respectively. Relay winding 39 is designed to operate its associated contacts before relay winding 40 actuates its associated contacts. The energization of relay winding 39 opens relay contacts 39A to de-energize relay winding 37. The de-energization of relay winding 37 opens contacts 37C to de-energize the load connected thereto. The energization of relay winding 40 opens contact assembly 40A to thereby remove the energization from relay winding 39.

The load connected to any sub-module may also be manually stopped by positioning wiper 54B on switch 54 to terminal 7 on this switch to open the energization circuit for relay winding 37. It may be noted that the terminals 1 to 6 on each of the sections of switches 53 and 54 correspond to the respective time signal channels and that in the last noted instance, terminals 1 to 6 are connected in common.

Any or all of the sub-modules and respective loads may be manually started in a sequential manner. This is accomplished by positioning switch 53 so that the respective wipers 53A and 53B are connected to the corresponding terminal 7. Terminal 7, when engaged by wiper 53A, provides an energization circuit through relay contacts 24A of FIGURE 6, conductor 308, cable 60 and relay contact assembly 37A to relay winding 36. Closure of manually operated push button switch 55 of FIGURE 6 initiates operation of the stepping switch mechanism to sequentially start all of the loads connected to the proper terminals for a manual start (which may only occur in a sequenced manner through operation of the stepping switch assembly).

Closing of switch 55 serves to energize relay winding 22 through relay contact assembly 23B. The energization of relay winding 22 serves to energize relay winding 23 through the closure of contacts 22A; provide a holding circuit relay contact assembly 22D and relay contact assembly 15A energize a pilot light indicator 55A through contacts 22C connected to contact 22D and complete a circuit from relay winding 24 through conductor 330 to the stationary contact on relay 10B. The closure of relay contact 22C of FIGURE 6 serves to energize relay winding 8 through relay contact assembly 23A, relay contact assembly 22C and conductor 306. Energization of relay winding 23 actuates its associated contacts to provide a connection to switch 55 through the engagement of the movable contact on assembly 23B with the right hand stationary contact and serves to disengage the right hand stationary contact from the left hand stationary contact in the connection to relay winding 22. Actuation of contact assembly 23A opens the energization circuit for relay winding 8. Relay winding 8 remains energized through a holding circuit and initiates the action of the stepping switch relay and associated control circuitry as outlined above for an automatic start. All of the sub modules indexed, by their start program selector switches to corresponding terminals 7, will be sequentially started. Upon the end of a cycle of operation of the stepping switch assembly, relay winding 15 is again energized from terminal 421. The energization thereof actuates relay contact assembly 15A to de-energize relay winding 22 which in turn de-energizes relay windings 23 and 24 to complete the cycle followed on a manually actuated start.

If, for any reason, it is desirable to stop all of the loads simultaneously, push button switch 46 in master panel section 120 of FIGURE 2 may be depressed to de-energize relay winding 27, open contact 27D to de-energize relay windings 28 and 29, disengage movable contact on relay contact assembly 27C from the upper stationary contact to the lower stationary contact, open relay contact assembly 27B to de-energize relay winding 30 and disengage the movable contact on relay contact assembly 27A from the upper stationary contact to the lower stationary contact to energize relay winding 31. The operation of contact assembly 27C serves to energize relay winding 32 which actuates relay contacts 32A and 32B to establish a holding circuit for relay winding 32 should the stepping switch assembly be in operation at the time the push button 46 is depressed. This serves to complete a circuit to wipers 35D and 35E to cause stepping of the relay assemblies to the homing position whereupon relay contact 35C opens and relay winding 32 is de-energized. The de-energization of relay winding 30 opens relay contact assembly 30A to open the energization circuit for relay 37 to de-energize it and thereby de-energize the loads. The energization of relay winding 31 serves to position the movable contact on relay contact assembly 31A on the upper stationary contact and to establish a holding circuit for relay winding 31 through relay contact assembly 15C and relay contact assembly 31B.

It may occur to those skilled in the art that switch 46 may be of the alternate action type that reverses its contacts each time it is actuated. Upon a subsequent actuation of switch 46 relay winding 27 is energized to close its associated contact assemblies 27D and 27B to energize time delay relay winding 28 and relay winding 30. Further, the movable contacts of relay contact assemblies 27A and 27C are disengaged from the lower stationary contacts and engaged with the upper stationary contacts. The energization of relay winding 30 closes contact assembly 30A. The energization of relay winding 28 closes contact assembly 28A to energize relay 29 and further closes contact 28B to energize relay winding 8.

Subsequent actuation of relay contact assembly 29A provides a holding circuit therefor and de-energizes relay winding 28. The apparatus then completes one cycle of operation in which all of the loads that had been previously indexed to start by actuation of one or more of the channel relays 1 through 6 from a start pulse, will be energized as the stepping switch assembly proceeds through one cycle. During this cycle, relay winding 31 remains energized and pilot lamp 336 is energized to indicate to an operator that the apparatus is re-cycling. Upon completion of the re-cycling, the energization of relay winding 15 momentarily opens contact assembly 15C to de-energize relay winding 31. It may also be noted that the operation of pilot lamp indicator 338 is determined by the operation of relay contact assembly 29B which has its movable contact positioned against the lower stationary contact when relay winding 29 is de-energized and is positioned on the upper stationary contact when relay winding 29 is energized. Likewise, if for any reason the power should fail (it being understood that direct current power to the panel is a continuous nature and is not dependent upon commercial sources), relay contacts 25A, 26A or 42A may open to de-energize relay winding 41. Upon this occurrence, relay contact assembly 41A is opened to de-energize relay winding 27 and relay contact assembly 41B is closed to energize a power failure indicating pilot lamp 370. Upon subsequent resumption of commercial power the sequence of operation is the same as is followed and described above for resumption of operation after an emergency stop procedure.

It is understood that the time delay effected by time delay relay winding 28 may be utilized to allow a clock correction function to take place in the apparatus associated with time signal source 110. This feature is desirable after long interruptions of power to enable the channel relays 1 through 6 to position and index their respective contacts so that loads not energized at the start of the power failure, and which should have been energized sometime during the power failure, will be started and also that loads which may have been running at the start of the power failure and should have been de-energized during the power failure will not be re-started.

For the sake of clarity the circuitry associated with one panel sub section and its corresponding sub-modules and load has been illustrated above. It ought to be reasonably clear to those skilled in the art that a plurality of each of these components may be generally utilized in a system. Appropriate conductors, which may be included in the cables so designated, may be provided for such a system and an enlargement of any existing systems.

The following is a table of values of the components utilized in the circuitry of the above described embodiment:

*Table of values*

| Reference character: | Description |
| --- | --- |
| Relays 1, 2, 3, 4, 5, 6, 8, 9, 10, 11, 16, 17, 18, 19, 20, 21, 22, 24, 27, 29, 30, 31 | Telephone type having quick to act coil |
| Relays 7, 13, 14, 40 | Telephone type having slow to act coil |
| Relays 12, 15 | Telephone type having slow to release coil and non-inductive winding |
| Relays 23, 32 | Telephone type having two quick to act coils |
| Relays 25, 26 | Telephone type with alternating current coil |
| Relay 28 | Automatic Electric Co. series D.D.C. time delay relay |
| Relay 35 | Automatic Electric Co. type 45 stepping type relay |
| Relay 41 | Heat actuated time delay relay |
| Relays 36, 37, 38, 39 | Automatic Electric Co. Class "E" relay with quick-to-act coils |
| 201, 202, 203, 204, 205, 206 | 1N91 diode |
| 211, 212, 213, 214, 215, 216 | 75 ohm resistor |
| 321 | 50 ohm resistor |
| 221, 222, 223, 224, 225, 226 | 0.4 micro-farad capacitor |
| 320 | 0.2 micro-farad capacitor |

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Control apparatus for randomly and sequentially controlling a plurality of load devices comprising; a time signal source having a plurality of output terminals each providing a plurality of time signals; sequencing means connected to each of said plurality of channels and operative only in response to first alternate time signals thereon to provide a plurality of sequentially occurring third signals; a plurality of load devices; and a plurality of circuit means therefor for selectively connecting each of said load devices to said plurality of time channels and to said sequencing means, including means operable in response to said first alternate time signals to energize said load means only in response to said third signal and means operable in response to second alternate time signals to de-energize said load means.

2. Control apparatus for randomly and sequentially controlling a plurality of load devices comprising; a time signal source including a plurality of channels each providing first and second time signals; and sequencing means connected to each of said plurality of channels and operative only in response to said first signal therein to provide a plurality of sequentially occurring third signals; a plurality of load devices; and a plurality of circuit means therefor for selectively connecting each of said load devices to said plurality of time channels and to said sequencing means, including means operable in response to said first time signal to energize said load means only in response to said third signal and means operable in response to said second signal to de-energize said load means.

3. Control apparatus for selectively and sequentially controlling a plurality of load devices comprising; a time signal source having a plurality of output terminals each providing first and second time signals; sequencing means connected to each of said plurality of channels said means being energized to said first signal and being operable to provide a plurality of third signals to a plurality of load devices connected thereto; a plurality of load devices; and a plurality of circuit means for selectively connecting each of said load devices to said plurality of time channels and to said sequencing means, including means operable in response to said third signal to energize said load means and means operable in response to said second signal to de-energize said load means.

4. Control apparatus comprising; a first plurality of time signal sources each providing first and second time signals at pre-determinable times; a plurality of load means to be energized and de-energized in response to said first and second signals; sequencing means operative to sequentially energize load means connected thereto in response to said first signals; a plurality of relay means, corresponding in number to said plurality of time signal sources, one of said relay means being connected to each of said signal sources and operable between first and second conditions in response to said first and second time signals to provide corresponding sequential energization and simultaneous de-energization of load means connected thereto; circuit means for selectively connecting said load means to one of said relay means and said sequencing means so as to sequentially energize said load means when said relay means is in said first condition; and further circuit means for selectively connecting said load means to one of said relay means so as to de-energize said load means when said relay means is in said second condition.

5. Control apparatus comprising; a first plurality of time signal sources each providing first and second time signals at pre-determinable times; a plurality of load means to be energized and de-energized in response to said first and second signals; sequencing means operative to sequentially energize load means connected thereto in response to said first signals; a plurality of relay means, corresponding in number to said plurality of time signal sources; one of said relay means being connected to each of said signal sources and operable between first and second conditions in response to said first and second time signals to provide corresponding sequential energization and simultaneous de-energization of load means connected thereto; circuit means for selectively connecting said load means to one of said relay means and said sequencing means so as to provide energization of said load means when said relay means is in said first condition; circuit means interconnecting said relay means and said sequencing means for initiating operation thereof; and further circuit means for selectively connecting said load means to one of said relay means so as to provide de-energization of said load means when said relay means is in said second condition.

6. Control apparatus comprising; a source of time signals having N output channels each of said channels providing first and second signals; a plurality of load devices to be energized and de-energized in a random manner in response to said signals; first means for selectively interconnecting each of said load devices to one of said output channels to energize said load device in response to one of said time signals; and second means for selectively interconnecting each said load devices to one of said output channels to de-energize said load device in response to the other of time signals whereby $N^2$ number of combinations of energization and de-energization times for each of said load devices is provided.

7. A load switching control apparatus comprising: a source of time signals having N output channels; each of said output channels having a stop and a start signal supplied thereon, a plurality of load devices to be energized and deenergized in a random manner upon receiving a start and stop signal, respectively; first switch means selectively interconnecting at least one of said load devices to one of said output channels to energize said load device in response to said start signal thereon; and second switch means selectively interconnecting said load device to one of said output channels to de-energize said load device in response to said stop signal thereon whereby $N^2$ number of combinations of start and stop signals for each of said load devices is provided.

8. A load switching control apparatus comprising; a source of time signals having a plurality of output channels; and a plurality of load devices to be energized and de-energized in a random manner, said load devices having a time signal responsive means, switch means for each of said load devices connecting said time signal responsive means to one of said output channels for energization thereof, and further switch means for connecting said time signal responsive means to one of said output channels for de-energization thereof whereby a square of the number of channels is the number of combinations of energization and de-energization times for each of said load devices provided.

9. In a control apparatus for sequentially energizing a plurality of load devices comprising: a first source of signals, first means connected to said first source for providing in response to a signal from said first source a plurality of sequentially second signals, a plurality of control means each adapted to control the energization of one of the load devices, and connection means connecting each of said control means to said first means whereby a particular load device is energized in response to said first and second signals.

10. Control apparatus for sequentially energizing a plurality of load devices selected to be energized, a first signal source for selectively providing a plurality of first signals, a second signal source for providing a plurality of second signals in a sequential manner, a plurality of control means each being adapted to control one of the load devices, connection means connecting said second signal source to said first signal source whereby upon said second signal source receiving a first signal said second signal source provides said second signals, connection means for selectively connecting each of said control means to said first signal source and further connection means operative upon said control means receiving a first signal to connect each of said control means to said second signal source whereby each of said control means subsequentially receive a second signal in a sequential manner to energize said load devices in sequence.

References Cited by the Examiner
UNITED STATES PATENTS

| | | | |
|---|---|---|---|
| 2,844,811 | 7/58 | Burkhart | 307—115 X |
| 2,852,728 | 9/58 | Samson | 307—115 X |

LLOYD McCOLLUM, *Primary Examiner.*

ORIS L. RADER, *Examiner.*